United States Patent
Mizrahi et al.

(10) Patent No.: US 9,203,484 B2
(45) Date of Patent: Dec. 1, 2015

(54) USING SEQUENCES FOR SYMBOL TIMING SYNCHRONIZATION IN SINGLE-CARRIER MODULATION MIMO COMMUNICATION SYSTEMS

(71) Applicant: Ceragon Networks Ltd., Tel-Aviv (IL)

(72) Inventors: Haggai Mizrahi, Hod-HaSharon (IL); Isaac Rosenhouse, Kiryat-Ono (IL)

(73) Assignee: Ceragon Networks Ltd., Tel-Aviv (IL)

( * ) Notice: Subject to any disclaimer, the term of this patent is extended or adjusted under 35 U.S.C. 154(b) by 117 days.

(21) Appl. No.: 14/074,014

(22) Filed: Nov. 7, 2013

(65) Prior Publication Data

US 2014/0126664 A1    May 8, 2014

Related U.S. Application Data (60) Provisional application No. 61/723,824, filed on Nov. 8, 2012.

(51) Int. Cl.
  *H04B 7/04*  (2006.01)
  *H04B 7/10*  (2006.01)

(52) U.S. Cl.
  CPC ............... *H04B 7/0413* (2013.01); *H04B 7/10* (2013.01)

(58) Field of Classification Search
  CPC .................................................... H04B 7/0413
  USPC ................................. 375/267, 343
  See application file for complete search history.

(56) References Cited

U.S. PATENT DOCUMENTS

| | | | | |
|---|---|---|---|---|
| 2011/0149929 A1* | 6/2011 | Kleider et al. | ................ | 370/338 |
| 2012/0195328 A1* | 8/2012 | Otsuka et al. | ................ | 370/478 |
| 2014/0073974 A1* | 3/2014 | Engelbrecht | ................ | 600/502 |

OTHER PUBLICATIONS

Bohagen et al. "Construction and Capacity Analysis of High-Rank Line-of-Sight MIMO Channels", 2005 IEEE Wireless Communications and Networking Conference, Mar. 13-17, 2005, 1: 423-437, Mar. 2005.

Bohagen et al. "Modeling and Analysis of A 40 GHz MIMO System for Fixed Wireless Access", 2005 61st IEEE Vehicular Technology Conference, VTC 2005—Spring, May 30-Jun. 1, 2005, 3: 1691-1695, Jun. 2005.

Ingason et al. "Impact of Frequency Selective Channels on A Line-of-Sight MIMO Microwave Radio Link", 2010 71st IEEE Vehicular Technology Conference, VTC 2010—Spring, Taipei, TW, May 16-19, 2010, p. 1-5, May 2010.

Reinhardt et al. "Receiver Structures for MIMO-SC/FDE Systems", 63rd IEEE Vehicular Technology Conference, VTC 2006—Spring, Melbourne, Australia, May 6-10, 2006, 3: 1401-1405, May 2006.

Sarris et al. "Maximum MIMO Capacity in Line-of-Sight", 2005 Fifth International Conference on Information, Communications and Signal Processing, Bangkok, Thailand, p. 1236-1240, 2005.

* cited by examiner

*Primary Examiner* — Michael Neff (57) ABSTRACT

A method for symbol timing synchronization in multiple-input multiple-output (MIMO) communication, the method including transmitting a first symbol sequence including a preamble symbol sequence S1 from a first transmitting location, transmitting a second symbol sequence from a second transmitting location, the first and second symbol sequences being modulated onto a same carrier frequency, receiving a first mixture of the first and the second symbol sequences at a first receiving location, cross correlating the first mixture with a symbol sequence P1 thereby producing a first correlation output, and determining a first timing offset for receiving the first symbol sequence based, at least in part, on the first correlation output. Related apparatus and methods are also described.

23 Claims, 6 Drawing Sheets

USING SEQUENCES FOR SYMBOL TIMING SYNCHRONIZATION IN SINGLE-CARRIER MODULATION MIMO COMMUNICATION SYSTEMS

RELATED APPLICATION

This application claims the benefit of priority under 35 USC 119(e) of U.S. Provisional Patent Application No. 61/723,824 filed Nov. 8, 2012, the contents of which are incorporated herein by reference in their entirety.

FIELD AND BACKGROUND OF THE INVENTION

The present invention, in some embodiments thereof, relates to multiple-input multiple-output (MIMO) communication systems and, more particularly, but not exclusively, to methods and apparatus for using sequences for symbol timing synchronization in single-carrier modulation MIMO communication systems.

The term "single-carrier modulation" in all its grammatical forms is used throughout the present specification and claims to mean a modulation of a single carrier frequency.

Some non-limiting examples of single-carrier modulation include Quadrature Amplitude Modulation (QAM) and Phase Shift Keying modulation.

Communication systems in which the transmitted signal is emitted from several separate transmitting devices at one end of a communication link and is processed using signals from several receiving devices on the other side of the link are termed multiple-input multiple-output (MIMO) systems.

As an example we may consider several antennas located on one side of a link, each of them transmits a different signal, all signals are transmitted simultaneously using the same carrier frequency.

On the other side of the link we have several receiving antennas, each of which receives a slightly different signal due to being in a different position and possibly having a different radiation pattern. The received signals are typically processed together.

It is known that MIMO systems have a potential to significantly increase the efficiency of the communication systems. Such systems are capable of distinguishing between several signals transmitted simultaneously.

In practice many deployed MIMO communication systems use an OFDM or generally a multi-carrier modulation. Multi-carrier modulations such as OFDM greatly simplify timing synchronization at the receiver side. In OFDM timing offsets do not affect the frequencies of the multiple carriers, and appear as a shift in phase, easily correctable.

A special case related to MIMO systems is transmission in two polarizations. This concept is used in point-to-point microwave backhaul systems. In dual-polarization systems two signals are transmitted simultaneously using orthogonal polarizations of the electromagnetic waves. These signals are transmitted using the same carrier frequency, and generally interfere with each other at the receiving side. However, the mutual interference between the polarized signals is typically low. As an example, the interfering signal may by 20 dB lower than the desired signal.

Additional background art includes:

An article titled "Impact of Frequency Selective Channels on a Line-of-Sight MIMO Microwave Radio Link", by Ingason, Liu, Coldrey, Wolfgang and Hansryd, published in 71st IEEE Vehicular Technology Conference, Taipei 2010, pp. 1-5.

An article titled "Maximum MIMO Capacity in Line-of-Sight", by Sarris and Nix, published in Fifth international conference on information, communications and signal processing, Bangkok 2005, pp. 123-1240.

An article titled "Receiver structures for MIMO-SC/FDE Systems", by Reinhardt and Huemer, published in 63rd IEEE Vehicular Technology Conference, Melbourne 2006, pp. 1401-1405.

An article titled "Construction and Capacity Analysis of High-Rank Line-of-Sight MIMO Channels", by Bohagen, Orten and Oien, published in IEEE Wireless Communications and Networking Conference 2005, pp. 423-437.

An article titled "Modeling and Analysis of a 40 GHz MIMO System for Fixed Wireless Access", by Bohagen, Orten and Oien, published in $61^{st}$ IEEE Vehicular Technology Conference, 2005, pp. 1691-1695.

The disclosures of all references mentioned above and throughout the present specification, as well as the disclosures of all references mentioned in those references, are hereby incorporated herein by reference.

SUMMARY OF THE INVENTION

The present invention, in some embodiments thereof, provides a method and apparatus for distinguishing a preamble symbol sequence for synchronization of a first signal from a preamble symbol sequence from a second signal, even when the first signal and the second signal are mixed with each other at a small signal-to-interference ratio.

Distinguishing between the preamble symbol sequences of the two signals and detecting the timing offset of each of the two signals potentially enables distinguishing between the two signals, and allows sending two signals along a same route at a same frequency.

Distinguishing between the preamble symbol sequences of the two signals potentially enables locking one or more decoders onto one or both of the two signals even when the two signals interfere with each other at a small signal-to-interference ratio.

According to an aspect of some embodiments of the present invention there is provided a method for symbol timing synchronization in multiple-input multiple-output (MIMO) communication, the method including transmitting a first symbol sequence including a preamble symbol sequence S1 from a first transmitting location, transmitting a second symbol sequence from a second transmitting location, the first and second symbol sequences being modulated onto a same carrier frequency, receiving a first mixture of the first and the second symbol sequences at a first receiving location, cross correlating the first mixture with a symbol sequence P1 thereby producing a first correlation output, and determining a first timing offset for receiving the first symbol sequence based, at least in part, on the first correlation output.

According to some embodiments of the invention, S1 and P1 are symbol sequences such that a correlation between S1 and P1 produces a correlation output including a section having symbol values which approximate a line having a detectable specific location within the section.

According to some embodiments of the invention, the line is symmetric about the detectable specific location within the section. According to some embodiments of the invention, the line has a central peak.

According to some embodiments of the invention, the second symbol sequence includes a preamble symbol sequence S2, and further including receiving a second mixture of the first and the second symbol sequences at a second receiving location, cross-correlating the second mixture to a symbol sequence P2 thereby producing a second correlation output, and determining a second timing offset for receiving the second symbol sequence based, at least in part, on the second correlation output.

According to some embodiments of the invention, S1 and P2 are symbol sequences such that correlation between S1 and P2 produces a correlation output including a zero section with all symbols in the zero section lower in value than a maximum of the line approximated by correlation of S1 and P1 at least by an order of magnitude, and S2 and P1 are symbol sequences such that correlation between S2 and P1 produces a correlation output including a zero section with all symbols in the zero section lower in value than a maximum of the line approximated by correlation of S2 and P2 at least by an order of magnitude.

According to some embodiments of the invention, the transmitting the preamble symbol sequence S1 and the transmitting the preamble symbol sequence S2 each occur at a time such that the preamble symbol sequence S1 is received at a time overlapping a time when the preamble symbol sequence S2 is received.

According to some embodiments of the invention, the overlapping time is such that correlating S2 to P1 produces a zero section overlapping a maximum of the line approximated by correlation of S1 and P1.

According to some embodiments of the invention, the determining the first timing offset is based on a measure of symmetry of values of the first correlation output about a high value.

According to some embodiments of the invention, the determining the first timing offset includes finding an offset for which a peak value within the first correlation output is maximized.

According to some embodiments of the invention, the determining the first timing offset includes finding a difference between two symbols adjacent to a maximum value signal within the first correlation output.

According to some embodiments of the invention, the determining the first timing offset includes comparing a sum of energy included in symbols prior to a maximum value signal and a sum of energy included in symbols following the maximum value signal within the first correlation output.

According to some embodiments of the invention, the determining the first timing offset includes evaluating a weighted average of indices of the first correlation output, where the weights are an even power of the values at these indices.

According to some embodiments of the invention, the first transmitting location includes a first transmitting antenna, the second transmitting location includes a second transmitting antenna, the first receiving location includes a first receiving antenna, and the second receiving location includes a second receiving antenna.

According to an aspect of some embodiments of the present invention there is provided a multiple-input multiple-output (MIMO) communication system including a transmitting MIMO unit configured to transmit a first symbol sequence including a preamble symbol sequence S1 from a first transmitting location, and a second symbol sequence from a second transmitting location, the first and second symbol sequences being modulated onto a same carrier frequency, and a receiving MIMO unit including a first receiving location configured to receive the first and the second symbol sequences, a correlator for correlating the first and the second symbol sequences with a symbol sequence P1 to produce a first correlation output, a timing offset estimator for determining a first timing offset for receiving the first symbol sequence based, at least in part, on the first correlation output.

According to some embodiments of the invention, the transmitting MIMO unit is further configured to transmit a second symbol sequence comprising a preamble symbol sequence S2 from a second transmitting location, the receiving MIMO unit further includes a correlator for correlating the first and the second symbol sequences with a symbol sequence P2 to produce a second correlation output, and a timing offset estimator for determining a second symbol timing synchronization for receiving the second symbol sequence based, at least in part, on the second correlation output.

According to some embodiments of the invention, the transmitting MIMO unit is configured to transmit the preamble symbol sequence S1 and the preamble symbol sequence S2 timed so that the preamble symbol sequence S1 is received by the receiving MIMO unit at a time overlapping a time at which the preamble symbol sequence S2 is received by the MIMO receiver.

According to some embodiments of the invention, the overlapping time is such that correlating S2 to P1 produces a zero section overlapping a maximum of a line approximated by correlation of S1 and P1.

According to some embodiments of the invention, S1 and P1 are symbol sequences such that a cross-correlation between S1 and P1 produces a cross-correlation output including a section having symbol values which approximate a line having a detectable specific location within the section, and S1 and P2 are symbol sequences such that cross-correlation between S1 and P2 produces a cross-correlation output including a zero section with all symbols in the zero section lower in value than a maximum of the line approximated by correlation of S2 and P2 at least by an order of magnitude.

According to some embodiments of the invention, the line has a central peak.

According to some embodiments of the invention, the first transmitting location includes a first transmitting antenna, the second transmitting location includes a second transmitting antenna, the first receiving location includes a first receiving antenna, and the second receiving location includes a second receiving antenna.

According to an aspect of some embodiments of the present invention there is provided a single-carrier multiple input multiple output (MIMO) receiver including a first location configured to receive a first mixture of a first symbol sequence and a second symbol sequence, a correlator for correlating the first mixture with a symbol sequence P1 to produce a first correlation output, and a timing estimator for determining a first timing offset for receiving the first symbol sequence based, at least in part, on the first correlation output.

According to some embodiments of the invention, further including a second location configured to receive a second mixture of the first symbol sequence and the second symbol sequence, a correlator for correlating the first symbol sequence and the second symbol sequence with a symbol sequence P2 to produce a second correlation output, and a timing offset estimator for determining a second timing offset for receiving the second symbol sequence based, at least in part, on the second correlation output.

According to some embodiments of the invention, S1 and P1 are symbol sequences such that a cross-correlation between S1 and P1 produces a cross-correlation output including a section having symbol values which approximate a line having a detectable specific location within the section, and S1 and P2 are symbol sequences such that cross-correlation between S1 and P2 produces a cross-correlation output including a zero section with all symbols in the zero section lower in value than a maximum of the line approximated by correlation of S1 and P1 at least by an order of magnitude.

According to some embodiments of the invention, the line has a central peak.

According to some embodiments of the invention, the determining the first timing offset includes evaluating a weighted average of indices of the first correlation output, where the weights are an even power of the values at these indices.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to multiple-input multiple-output (MIMO) communication systems and, more particularly, but not exclusively, to methods and apparatus for using sequences for symbol timing synchronization in single-carrier modulation MIMO communication systems.

Overview

In MIMO systems, an interfering signal may be as large as a desired signal and even larger. It is not straight-forward to apply algorithms and circuits deployed in systems such as dual-polarization systems to MIMO systems.

For sake of explanation, example systems which use embodiments of the invention are described with reference to single-carrier modulation MIMO communication systems. More specifically, Quadrature-Amplitude Modulation (QAM) communication systems are described. In such example cases, a MIMO receiver is required to separate a mixture of signals received by the MIMO receiver into multiple streams of information. In order to separate the mixture of signals as received by each receiving antenna of a MIMO system, symbol timing of the different symbol streams should be synchronized.

The term "antenna" in reference to a MIMO system is used throughout the present specification and claims to mean a transmitting location and a receiving location. A transmitting location or a receiving location may actually include more than one antenna to send a signal on a single carrier.

The synchronization is optionally performed prior to separating the mixtures; hence the synchronization is typically performed in a high-interference scenario. Embodiments of the invention described below are capable of performing the synchronization by using well-designed symbol sequences inserted periodically among the data symbols of the different streams.

The present invention, in some embodiments thereof, provides a method and apparatus for distinguishing a preamble symbol sequence for synchronization of a first signal from a preamble symbol sequence for a second signal, even when the first signal and the second signal are mixed with each other at a small signal-to-interference ratio.

Distinguishing between the preamble symbol sequences of the two signals and detecting the timing offset of each of the two signals potentially enables distinguishing between the two signals, and allows receiving and decoding the two signals even when carried by a single carrier.

An example embodiment may be a MIMO transmitter set up with two transmitting antennas transmitting along a line-of-site to two receiving antennas set up side by side. The two transmitting antennas transmit two different data streams, using the same single carrier frequency, each of the data streams potentially at a full bandwidth enabled by the modulation. A receiver connected to the two receiving antennas can receive and decode the two different data streams, based on a difference between a mixture of the two streams as received in one receiving antenna from a mixture of the two streams as received in a second receiving antenna.

Embodiments described herein teach how to measure timing offset of the data streams so as to enable the receiver to accurately synchronize on the received signals, so that decoding and differentiating between the two data streams is made possible.

Standard methods for timing synchronization in QAM receivers have failed in the MIMO scenario. If two MIMO transmitters do not share the same timing, then a standard QAM timing loop often wanders between different timings, typically being attracted to a temporarily-larger signal among the two signals of the two MIMO transmitters.

In the description of embodiments of the invention two transmitting devices and two receiving devices are used as an example. Such a configuration is termed 2×2 MIMO. However, it is straight-forward to generalize the concepts described herein to 3×3 MIMO, 4×4 MIMO and so on.

It is noted that N×M is also possible, where N is not equal to M. The synchronization method described herein applies also to N×M MIMO.

By way of a non-limiting example, when using 3 transmitting antennas and 4 receiving antennas 3 different streams of information may be transmitted, like in 3×3 MIMO. When the receiver side has 4 antennas, the $4^{th}$ antenna can potentially increases diversity and improve performance.

By way of another non-limiting example it is also possible to have 4 transmitting antennas and 3 receiving antennas, in which case the $4^{th}$ transmitting antenna, in addition to providing transmission diversity, can also potentially increase total transmitted power and further improve performance.

Transmission of QAM data symbols with a sequence of preamble symbols inserted periodically is described herein. Each of two example transmitting devices optionally has its own unique sequence of preamble symbols.

Figure 1:
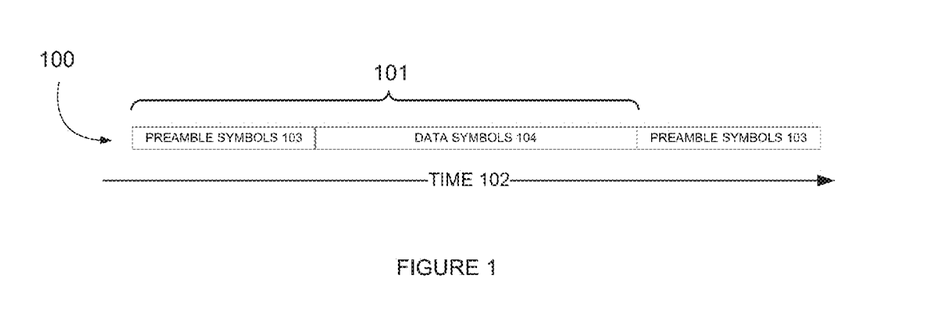
FIG. 1 is a simplified block diagram illustration of a stream of data which includes a sequence of preamble symbols and a sequence of data symbols according to an example embodiment of the invention.

Reference is now made to FIG. 1, which is a simplified block diagram illustration of a stream 100 of data which includes a sequence of preamble symbols 103 and a sequence of data symbols 104 according to an example embodiment of the invention.

FIG. 1 depicts a stream 100 of symbols to be transmitted. A set of symbols starting with a sequence of preamble symbols 103, continuing with a sequence of data symbols 104 and ending just before a following sequence of preamble symbols 103 is termed a frame 101 of symbols, or, shortly a frame 101.

The sequence of preamble symbols 103 and the sequence of data symbols 104 are depicted along a time axis 102.

The sequence of preamble symbols 103 may be QPSK symbols, QAM symbols, or even arbitrary symbols. It may be convenient to use QPSK symbols.

The sequence of preamble symbols 103 of a first transmitting device is denoted as S1, and the sequence of preamble symbols 103 of a second transmitting device is denoted as S2.

It is possible to find two sequences, which are denoted P1 and P2, for which the following properties exist:

A cross-correlation between S1 and P1, as a function of time delay, has a section including a sequence of small-magnitude values, approximated as zeros, followed by a relatively large-magnitude value, and followed by another sequence approximated as zeros. A section with such a pattern is termed here a delta-function section.

A cross-correlation between S1 and P2 as a function of the time delay has a zero section of small-magnitude values, approximated as zeros.

A cross-correlation between S2 and P2 as a function of the delay has a delta-function section.

The cross-correlation between S2 and P1 as a function of the delay has a zero section of small-magnitude values, approximated as zeros.

The symbol sections mentioned above optionally overlap in time, at least partly. The overlapping in time is such that correlating S2 to P1 produces a zero section overlapping the maximum of the delta function formed by correlation of S1 and P1, so that the maximum of the delta function towers above the values of the zero section.

The zero section, and other symbols described herein as having a value of approximately zero are optionally defined as having values lower than a maximum of the delta function formed by correlation of S1 and P1 at least by an order of magnitude.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2A:
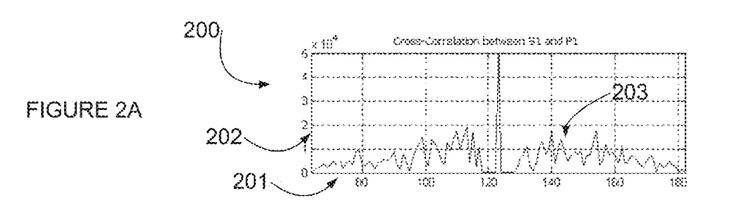
FIG. 2A is a graph of a cross correlation between a preamble symbol sequence S1 and a corresponding symbol sequence P1 according to an example embodiment of the invention.

Reference is now made to FIG. 2A, which is a graph 200 of a cross-correlation between a preamble symbol sequence S1 and a corresponding symbol sequence P1 according to an example embodiment of the invention.

The graph 200 has an X-axis 201 depicting time, and a Y-axis 202 depicting magnitude of symbol values.

A line 203 depicts the cross-correlation between S1 and P1.

The symbol values are discrete, and the line 203 depicted in FIG. 2A is a line which passes approximately through the symbol values.

Figure 2B:
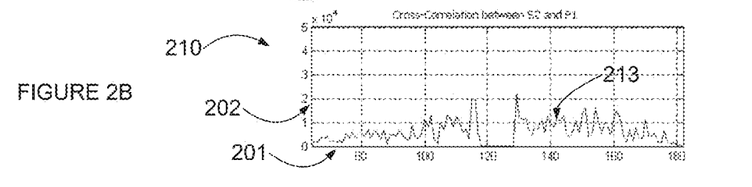
FIG. 2B is a graph of a cross correlation between a preamble symbol sequence S2 and a corresponding symbol sequence P1 according to an example embodiment of the invention.

Reference is now made to FIG. 2B, which is a graph 210 of a cross correlation between a preamble symbol sequence S2 and a symbol sequence P1 according to an example embodiment of the invention.

The graph 210 has an X-axis 201 depicting time, and a Y-axis 202 depicting magnitude of symbol values.

A line 213 depicts the cross-correlation between S2 and P1.

The symbol values are discrete, and the line 213 depicted in FIG. 2B is a line which passes approximately through the symbol values.

There are potentially an infinite number of such sequences. Moreover, for any given set of sufficiently different sequences S1 and S2 it is typically possible to find sequences P1 and P2 that comply with these requirements. Moreover, the principle taught herein is extendable to more sequences. For example, for embodiments which include three different sequences S1, S2, and S3, it is possible to find three sequences, P1, P2 and P3 for which the cross-correlation between Si and Pi has a delta-function section, and the cross-correlation between Si and Pj, where i and j are different, has an approximately zero-valued section.

In practice, the term zero is optionally interpreted as any magnitude sufficiently close to zero relative to the magnitude of a maximum of the delta function.

A challenge with MIMO systems is the fact that when we wish to estimate parameters related to transmitter number 1, we are likely to suffer from large interference from other transmitters, e.g., transmitter number 2.

One alternative is to mute all other transmitters while transmitter number 1 is transmitting a sequence from which parameters are to be estimated for purpose of synchronization. The muting method may work, but the muting method is inefficient, especially when there are large numbers of transmitters in a MIMO system. The mute time will increase linearly with the number of transmitters in the system.

Embodiments of this invention optionally allow several, even all, transmitters to transmit their sequences simultaneously. Additionally, the embodiments lend themselves to simple timing synchronization by accurately estimating timing offsets.

For example, two transmitters are considered. If the two transmitters transmit the sequences S1 and S2 simultaneously, it is possible for a receiver to cross-correlate input samples with P1 and with P2. Since the cross-correlation between S2 and P1 gives a section with zeros, the interference from S2 is eliminated at a correlator output.

The cross-correlation between S1 and P1 provides a delta-function section, which overlaps the zero section mentioned above, and makes estimating parameters easy.

Figure 3A:
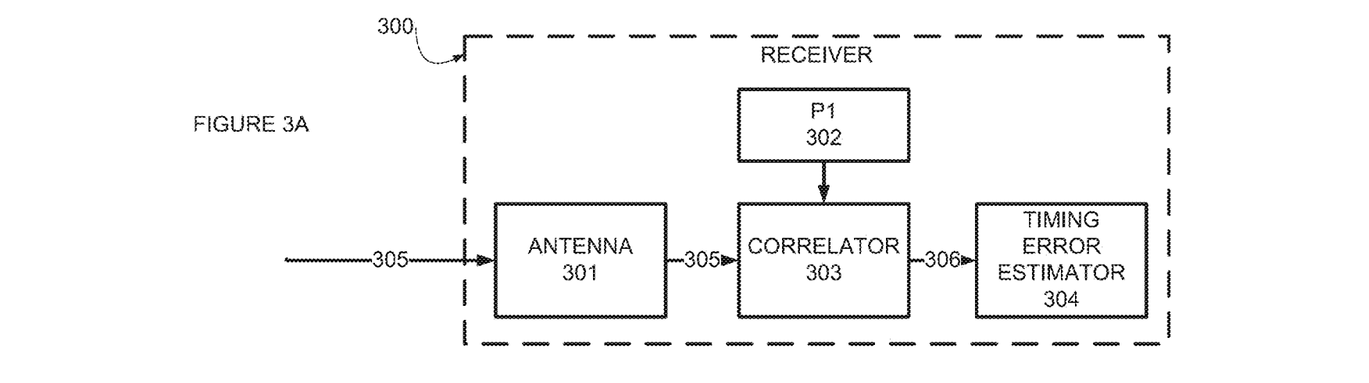
FIG. 3A is a simplified block diagram of components of a MIMO receiver according to an example embodiment of the invention.

Reference is now made to FIG. 3A, which is a simplified block diagram of components of a MIMO receiver 300 according to an example embodiment of the invention.

The MIMO receiver 300 includes an antenna 301 which receives a signal 305 which potentially may include a mixture of signals from transmitted more than one antenna of a MIMO transmitter. A desired one of the signals includes a preamble sequence S1.

The antenna 301 passes the received signal 305 to a correlator 303. The correlator 303 optionally correlates the received signal 305 with a symbol sequence P1 302, producing an output 306 of a correlated signal. The output 306 will include a delta function when the preamble sequence S1 is correlated with the symbol sequence P1. The output 306 of the correlator 303 is optionally fed into a timing error estimator 304, also termed a timing offset estimator, which may produce a synchronization output which will serve for synchronizing a symbol decoder (not shown). A timing offset which serves for synchronization is optionally deduced from a shape of a line passing through values of the output 306 of the correlator 303. More details on estimating timing error which optionally serves for synchronization are provided further below.

Figure 3B:
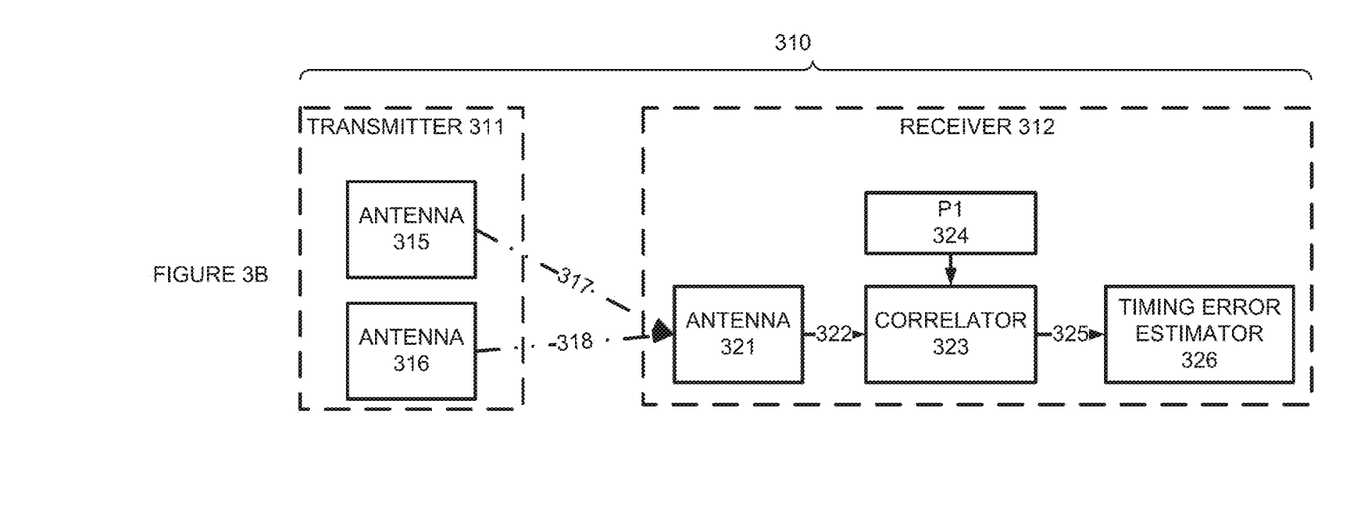
FIG. 3B is a simplified block diagram of components of a MIMO communication system according to an example embodiment of the invention.

Reference is now made to FIG. 3B, which is a simplified block diagram of components of a MIMO communication system 310 according to an example embodiment of the invention.

The MIMO communication system 310 includes at least one MIMO transmitter 311 and at least one MIMO receiver 312.

The MIMO transmitter 311 includes, by way of a non-limiting example, two antennas 315 316. The two antennas both optionally transmit signals 317 318. By way of example, it is the signal 317 transmitted by the antenna 315 which includes a preamble symbol sequence S1.

The receiver 312 includes an antenna 321 which receives a mixture of the signals 317 318 transmitted by the antennas 315 316.

The antenna 321 passes the received signal 322 to a correlator 323. The correlator 323 optionally correlates the received signal 322 with a symbol sequence 324, producing an output 325 of a correlated signal. The output 325 is optionally fed into a timing error estimator 326, which may produce a synchronization output which will serve for synchronizing a symbol decoder (not shown).

Figure 3C:
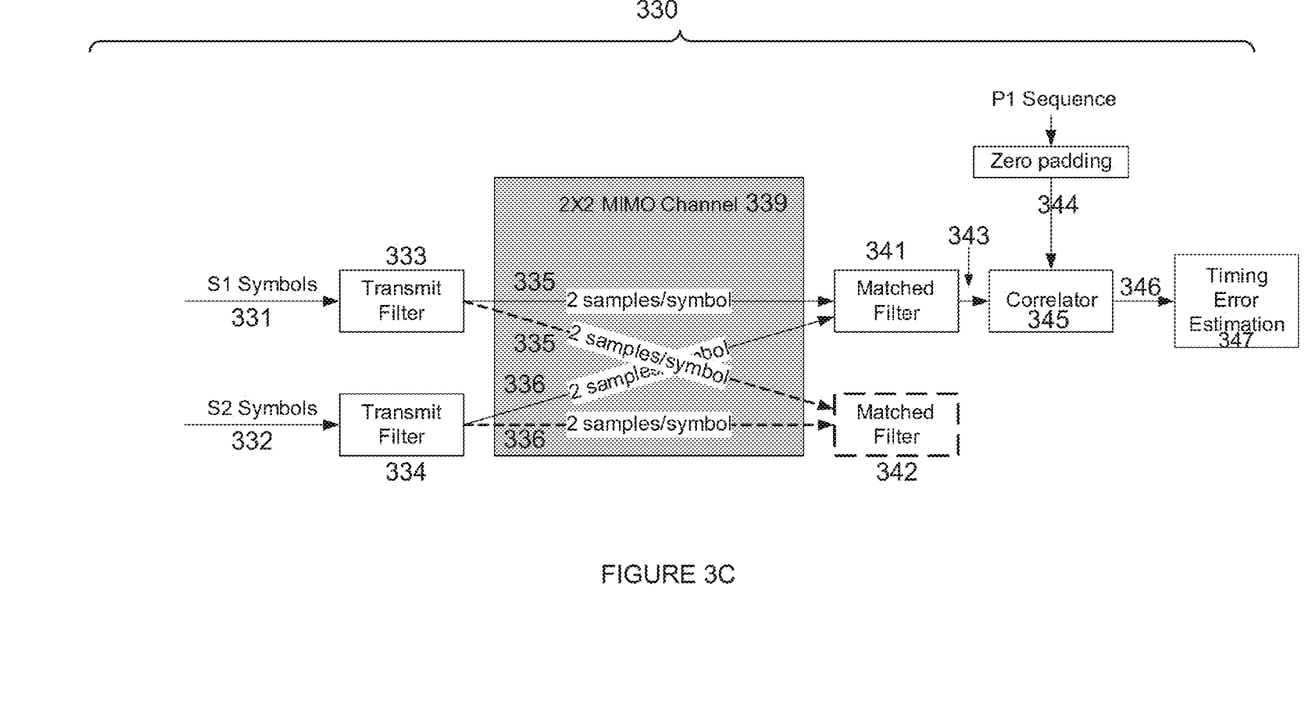
FIG. 3C is a simplified block diagram of components of a MIMO communication system according to another example embodiment of the invention.

Reference is now made to FIG. 3C, which is a simplified block diagram of components of a MIMO communication system 330 according to another example embodiment of the invention.

Symbol sequences S1 331 and S2 332 which are to be transmitted are optionally, in some embodiments, filtered by transmit filters 333 334 and interpolated at a rate of two samples per symbol producing transmission signals 335 336.

The sampling rate of two samples per symbol is used herein as an example, and it is noted that other sampling rates are also possible—for example 1.5 samples per symbol or 4 samples per symbol.

The transmission signals 335 336 are transmitted, and propagate via space depicted in FIG. 3C as the 2×2 MIMO channel 339.

After passing through the MIMO channel 339 the signals 335 336 are received by antennas (not shown). However, it is to be noted that typically each of the antennas receive a mixture of the signals 335 336.

The mixture is optionally, in some embodiments, filtered by matched filters 341 342, optionally one matched filter per antenna, producing a filtered output 343.

In some embodiments, the optional matched filters, together with the optional transmitter filters, provide an impulse response which is substantially Inter-Symbol-Interference (ISI) free, that is, different symbols do not interfere with each other when sampled at an optimal sampling time.

It is noted that symbol timing synchronization is what can help make the received signal ISI-free.

Figure 4:
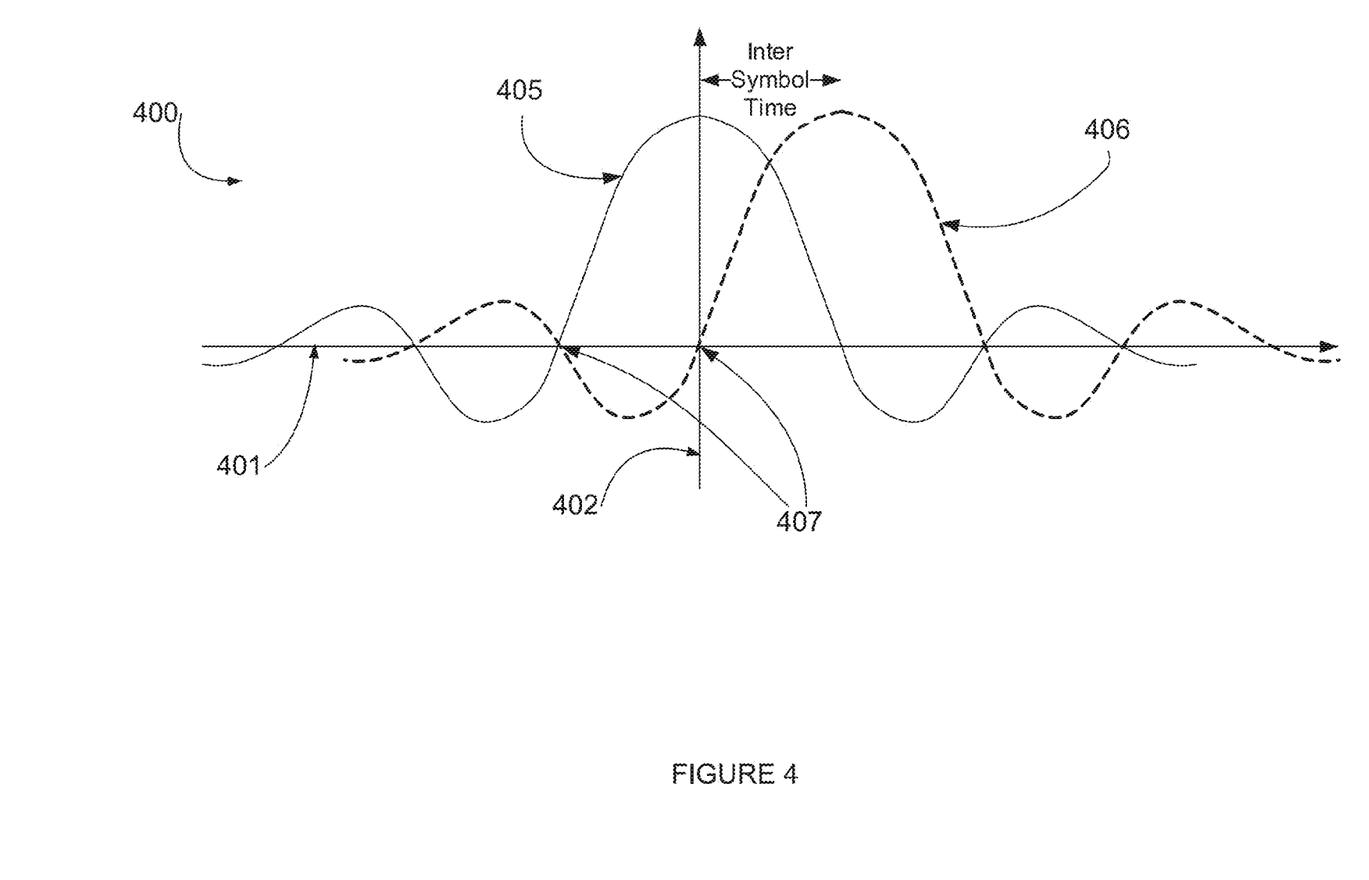
FIG. 4 is a simplified graph of an impulse response of symbols transmitted via transmit filter and received via a matched receive filter according to an example embodiment of the invention.

An impulse response as mentioned above is better understood graphically, as shown in FIG. 4.

Reference is now additionally made to FIG. 4, which is a simplified graph 400 of an impulse response of symbols transmitted via transmit filter and received via a matched receive filter according to an example embodiment of the invention.

The graph 400 has an X-axis 401 depicting time, and a Y-axis 402 depicting magnitude. A first line depicts an impulse response 405 of an $n^{th}$ symbol transmitted via transmit filter and received via a matched receive filter, and a second line depicts an impulse response 406 of an $(n+1)^{th}$ symbol transmitted via transmit filter and received via a matched receive filter.

An impulse response 406 of an $(n+1)^{th}$ symbol does not interfere with impulse responses of previous or next symbols when timing is correct, since the impulse response 407 is zero, more or less, at centers of previous or next symbol impulse responses.

Referring back to FIG. 3C, after being filtered by the matched filter 341, the output 343 is optionally correlated with a zero-padded P1 sequence 344 by a correlator 345, producing as an output a sequence of values 346. The sequence of values 346 is optionally provided to a Timing Error Estimation unit 347.

In some embodiments, the zero padded P1 sequence 344 is optionally made to have the same sample rate as a sample rate at the matched filter 341 output.

By way of a non-limiting example, 2 samples per symbol are used at the matched filter 341 output. In order to have the same sample rate, the P1 sequence may optionally be zero padded such that every second sample is zero. This padding is demonstrated in FIG. 5.

Figure 5:
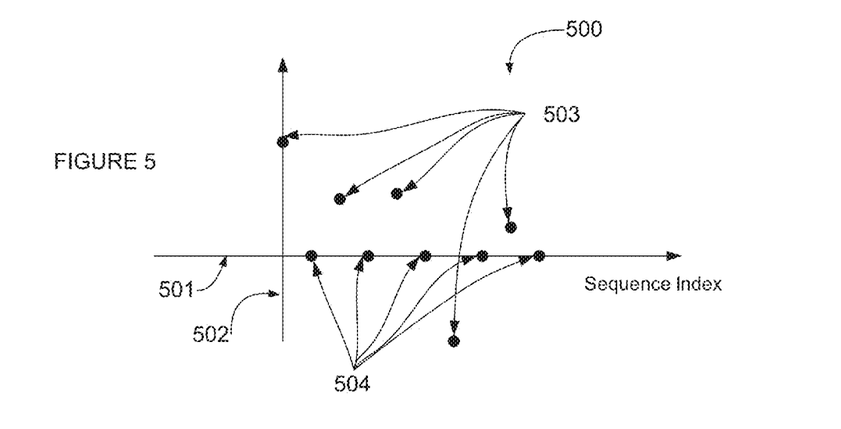
FIG. 5 is a simplified graph of a zero padded P1 symbol sequence according to an example embodiment of the invention.

Reference is now made to FIG. 5, which is a simplified graph 500 of a zero padded P1 symbol sequence according to an example embodiment of the invention.

The graph 500 has an X-axis 501 of a sequence index, and a Y-axis 502 of magnitude, or symbol values. When the symbol sequence P1 values 503 are as depicted in the graph 500, the P1 values 503 may be padded with zero values 504, as is depicted in FIG. 5.

Figure 6:
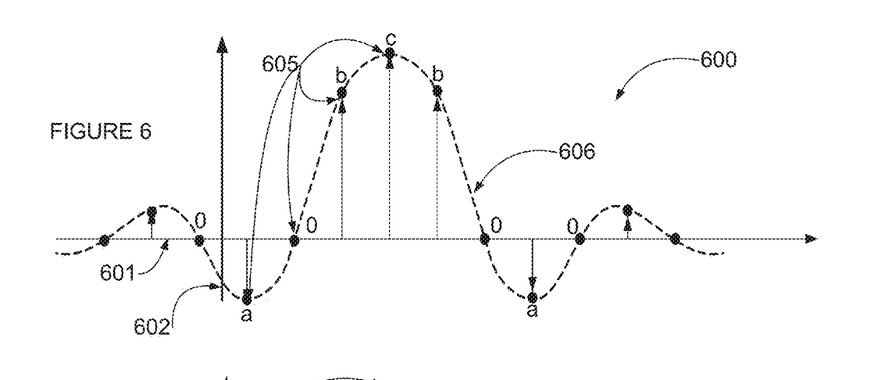
FIG. 6 is a simplified graph of an output of a correlator for a delta-function section with perfect timing and two samples per symbol according to an example embodiment of the invention.

Reference is now made to FIG. 6, which is a simplified graph 600 of an output of a correlator for a delta-function section with perfect timing and two samples per symbol according to an example embodiment of the invention.

The graph 600 has an X-axis 601 of time, and a Y-axis 602 of magnitude. Values 605 of output of the correlator are depicted in the graph 600, and the values 605 are also connected by a line 606 which depicts the delta function.

Cross correlation between S1 and P1, with 2 samples per symbol and with perfect timing may appear as depicted in FIG. 6.

It is noted that symmetry is present in the correlator output depicted in FIG. 6.

If however, there is a timing offset between a received signal and a decoder, the symmetry of FIG. 6 is altered. For example, the two values adjacent to a peak value will not have equal magnitude.

Figure 7:
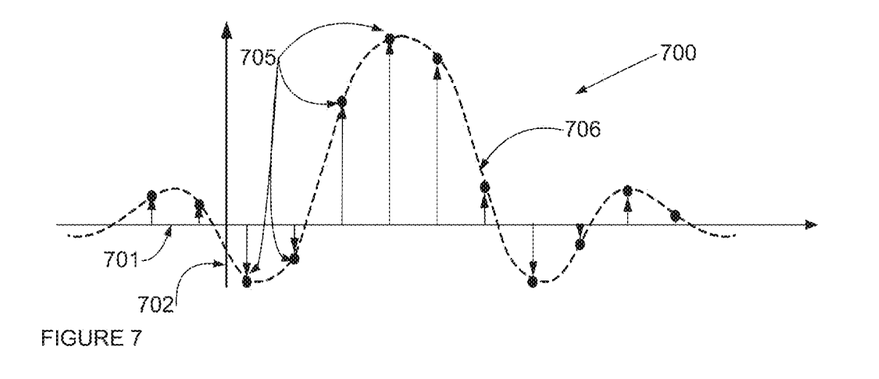
FIG. 7 is a simplified graph of an output of a correlator for a delta-function section with a non-perfect timing with two samples per symbol according to an example embodiment of the invention.

Reference is now made to FIG. 7, which is a simplified graph 700 of an output of a correlator for a delta-function section with a non-perfect timing with two samples per symbol according to an example embodiment of the invention.

The graph 700 has an X-axis 701 of time, and a Y-axis 702 of magnitude. Values 705 of output of the correlator are depicted in the graph 700, and the values 705 are also connected by a line 706 which depicts a shifted delta function relative to locations of the values 705.

Cross correlation between S1 and P1, with 2 samples per symbol and with a timing offset, also termed timing error, may appear as depicted in FIG. 7.

Estimating Timing Error in Case of a Delta-Function-Like Correlator Output

In the following description i denotes an index of a correlator output in a symbol section for which correlation with $P_j$ (for example P1, or P2) has been done, and which is assumed to be a delta function section. An odd number of indices i are assumed, that is, i=−N, −N+1, . . . , N. $C_i$ denotes a correlation value for index i.

The use of the term "delta-function-like" correlator output is meant in a sense typical of communications, to refer to a line passing through correlator output values which has a shape with a narrow peak, and a maximum value higher than its surroundings. The width of the peak may be one correlator output value, or a small number of correlator output values such two or three correlator output values. An example of such a shape is depicted in FIG. 2A.

Referring again to FIG. 6, which is a simplified graph of an output of a correlator for a delta-function section with perfect timing and two samples per symbol, FIG. 6 depicts a delta function section with the following series of correlator output values: 0 a 0 b c b 0 a 0—where c is a peak value. Values of the odd indices in the series are 0 0 c 0 0, which provide a pattern of a delta function.

In some embodiments estimating timing error is also performed in case of a non-delta-function-like correlator output. Other shapes of a Si-Pi cross-correlation output are optionally evaluated in order to estimate timing error, or timing offset. Some example embodiments are discussed below.

A method for estimating symbol timing error is now described, using several example alternatives, corresponding to several example embodiments:

A difference or normalized difference between two samples adjacent to a center peak can serve as a timing-error detector (TED) value. For example—

$$TED = \frac{C_1 - C_{-1}}{C_1 + C_{-1}}.$$

FIGS. 6 and 7 demonstrate that the cross-correlation function has a decaying envelope. Any function which compares energy on the left and right side of the center index i=0 may optionally serve as a timing error detector. In some embodiments, energy is taken to be a sum of squared values. For example—

$$TED = \frac{\text{Energy}(i > 0) - \text{Energy}(i < 0)}{\text{Energy}(i > 0) + \text{Energy}(i < 0)}.$$

In some embodiments, instead of energy higher order even-powers of the values are used.

In some embodiments, a weighted average of the indices, where the weights are an even power of the values at these indices is used. For example—

$$TED = \frac{\sum_{i=-N}^{N} i \cdot C_i^{2M}}{\sum_{i=-N}^{N} C_i^{2M}}.$$

In some embodiments the correlator output serves as a timing-error-detector since the correlator output eliminates interference from other transmitters and produces a delta-function section from which a time shift of a signal under consideration can be estimated.

Estimating Timing Error in Case of a Non-Delta-Function-Like Correlator Output

In some embodiments, the correlator output does not produce a delta-function-like section, but a section which resembles a different pattern. Any pattern which allows timing estimation, according to one of the methods mentioned above, or some other method, is potentially suitable.

In some embodiments, Si and Pj (where i=j) preamble symbol sequences are selected so that a line passing through the Si–Pj correlator output values produces a symmetrical shape.

In some embodiments the symmetrical shape has a maximum, optionally a narrow maximum, somewhere along the sequence of correlator output values.

In some embodiments Si and Pj (where i is not equal to j) preamble symbol sequences are selected so that Si–Pj correlator output values are close to zero.

An example sequence of symmetrically decaying correlator output values, around a center: {0, 0, . . . , 0, 0.25, 0.5, 1, 0.5, 0.25, 0, 0, . . . , 0}. The sequence has values which are arbitrarily selected, yet symmetric. Symmetry potentially makes time offset estimation simpler.

When the preamble symbol sequences mentioned above are transmitted periodically, and used periodically to estimate TED values, or timing offsets, it is possible to use the TED in a standard phase-locked-loop (PLL) for tracking and correcting timing variations.

In some embodiments, a timing error is optionally corrected before a receiver's matched filter by shifting sample time according to an indication from the PLL. Shifting the sample time may be done using known methods.

In some embodiments the above procedure for estimating timing offset serves for frame synchronization.

Finding the Sequences Si and Pi

It has been mentioned above that for a given set of preamble sequences S1 it is possible to find corresponding sequences to cross-correlate with—Pi which produce the above-mentioned delta-function section and the above-mentioned zero sections upon cross-correlation. In some embodiments the following method is used to find the sequences Si and Pi. The method is described using 4 sequences, that is i=1, 2, 3 and 4. The method remains similar for any number of sequences.

4 preamble sequences of length N, denoted by $S_1$, $S_2$, $S_3$ and $S_4$ are taken. We search for a sequence—$P_1$—of length L of complex symbols whose correlation with $S_1$ produces a delta function among 2Z zeros, and whose correlation with $S_2$, $S_3$ and $S_4$ produces 2Z+1 consecutive zeros.

A notation—$L_z=2Z+1$ is used for denoting the number of constraints per preamble sequence. It is noted that generally Lz may optionally be different for each sequence.

Mathematically the above requirements are expressed as follows:

$$\begin{pmatrix} \begin{pmatrix} 0 \\ \vdots \\ 1 \\ \vdots \\ 0 \end{pmatrix} \\ \begin{pmatrix} 0 \\ \vdots \\ 0 \end{pmatrix} \\ \begin{pmatrix} 0 \\ \vdots \\ 0 \end{pmatrix} \\ \begin{pmatrix} 0 \\ \vdots \\ 0 \end{pmatrix} \end{pmatrix}_{4L_Z \times 1} = \begin{pmatrix} \begin{pmatrix} S_1((N-L+1)-0:N-0) \\ S_1((N-L+1)-1:N-1) \\ S_1((N-L+1)-2:N-2) \\ \vdots \\ S_1((N-L+1)-(L_Z-1):N-(L_Z-1)) \end{pmatrix} \\ \begin{pmatrix} S_2((N-L+1)-0:N-0) \\ \vdots \\ S_2((N-L+1)-(L_Z-1):N-(L_Z-1)) \end{pmatrix} \\ \begin{pmatrix} S_3((N-L+1)-0:N-0) \\ \vdots \\ S_3((N-L+1)-(L_Z-1):N-(L_Z-1)) \end{pmatrix} \\ \begin{pmatrix} S_4((N-L+1)-0:N-0) \\ \vdots \\ S_4((N-L+1)-(L_Z-1):N-(L_Z-1)) \end{pmatrix} \end{pmatrix}_{4L_Z \times L} \cdot \begin{pmatrix} P_{1,1} \\ P_{1,2} \\ \vdots \\ P_{1,L} \end{pmatrix}_{L \times 1}$$

Equation 1.1

Solving Equation 1.1 provides the required sequence—$P_1$.

Sequences which produce a delta function with respect to $S_2$, $S_3$ and $S_4$ are optionally obtained similarly.

For short the following matrix form notation is used:

$$\underline{Z} = \underline{S} \cdot \underline{P}$$

Equation 1.2

There are 4·Lz requirements in the equation set above. In order for a solution to exist, the length of a P-sequence is chosen to be at least as large as 4·Lz.

$$L \geq 4 \cdot L_z$$

Equation 1.3

Generally—the number of requirements can be different for each of the 4 sequences.

A length of the S-sequences is optionally larger than the length of the P-sequences+the number of constraints per sequence minus 2. This requirement is an outcome of the structure of the matrix in Equation 1.1.

$$N > L + L_z - 2$$

Equation 1.4

The rank of the matrix above is optionally as the rank of the requirements vector−4·(2Z+1).

$$\mathrm{rank}(\underline{S}) = 4 \cdot (2Z+1)$$

Equation 1.5

This generally yields the condition:

$$L > \sum_{i=1}^{4} L_{Z,i}$$

Equation 1.6

An Example Embodiment Method

Figure 8:
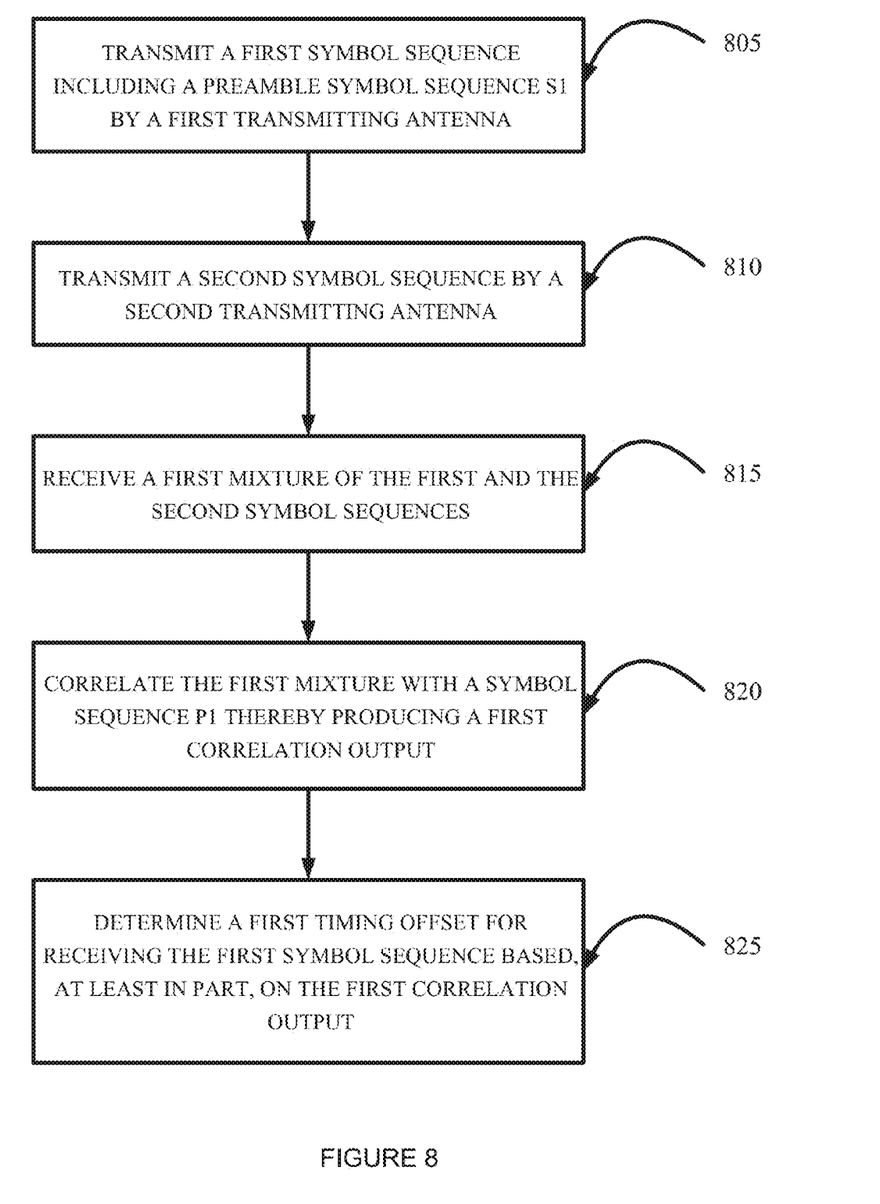
FIG. 8 is a simplified flow chart illustration of a method for symbol timing synchronization in a single-carrier modulation multiple-input multiple-output (MIMO) communication system according to an example embodiment of the invention.

Reference is now made to FIG. 8, which is a simplified flow chart illustration of a method for symbol timing synchronization in a single-carrier modulation multiple-input multiple-output (MIMO) communication system according to an example embodiment of the invention.

The method of FIG. 8 includes:

a transmitting MIMO unit transmitting a first symbol sequence including a preamble symbol sequence S1 by a first transmitting antenna (805);

the transmitting MIMO unit transmitting a second symbol sequence by a second transmitting antenna (810);

a first antenna in a receiving MIMO unit receiving a first mixture of the first and the second symbol sequences (815);

the receiving MIMO unit correlating the first mixture with a symbol sequence P1 thereby producing a first correlation output (820);

the receiving MIMO unit determining a first timing offset for receiving the first symbol sequence based, at least in part, on the first correlation output (825).

In some embodiments, the second symbol sequence comprises a preamble symbol sequence S2; and the above-mentioned method further comprises:

a second antenna in a receiving MIMO unit receiving a second mixture of the first and the second symbol sequences;

the receiving MIMO unit correlating the second mixture to a symbol sequence P2 thereby producing a second correlation output; and the receiving MIMO unit determining a second timing offset for receiving the second symbol sequence based, at least in part, on the second correlation output.

It is expected that during the life of a patent maturing from this application many relevant single carrier modulation systems and methods will be developed and the scope of the term single carrier modulation is intended to include all such new technologies a priori.

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for symbol timing synchronization in multiple-input multiple-output (MIMO) communication, the method comprising:

transmitting a first symbol sequence comprising a preamble symbol sequence S1 from a first transmitting location;

transmitting a second symbol sequence from a second transmitting location;

the first and second symbol sequences being modulated onto a same carrier frequency;

receiving a first mixture of the first and the second symbol sequences at a first receiving location;

cross correlating the first mixture with a symbol sequence P1 thereby producing a first correlation output; and determining a first timing offset for receiving the first symbol sequence based, at least in part, on the first correlation output, and on a measure of symmetry of values of the first correlation output about a high value of the correlation output.

2. The method of claim 1 in which:

S1 and P1 are symbol sequences such that a correlation between S1 and P1 produces a correlation output comprising a section having symbol values which approximate a line having a detectable specific location within the section.

3. The method of claim 2 in which the line is symmetric about the detectable specific location within the section.

4. The method of claim 3 in which the line has a central peak.

5. The method of claim 2 in which:

the second symbol sequence comprises a preamble symbol sequence S2;

and further comprising:

receiving a second mixture of the first and the second symbol sequences at a second receiving location;

cross-correlating the second mixture to a symbol sequence P2 thereby producing a second correlation output; and determining a second timing offset for receiving the second symbol sequence based, at least in part, on the second correlation output.

6. The method of claim 5 in which:

S1 and P2 are symbol sequences such that correlation between S1 and P2 produces a correlation output comprising a zero section with all symbols in the zero section lower in value than a maximum of the line approximated by correlation of S1 and P1 at least by an order of magnitude; and S2 and P1 are symbol sequences such that correlation between S2 and P1 produces a correlation output comprising a zero section with all symbols in the zero section lower in value than a maximum of the line approximated by correlation of S2 and P2 at least by an order of magnitude.

7. The method of claim 6 wherein:

the transmitting the preamble symbol sequence S1 and the transmitting the preamble symbol sequence S2 each occur at a time such that the preamble symbol sequence S1 is received at a time overlapping a time when the preamble symbol sequence S2 is received.

8. The method of claim 7 in which the overlapping time is such that correlating S2 to P1 produces a zero section overlapping a maximum of the line approximated by correlation of S1 and P1.

9. The method of claim 5 in which:

the first transmitting location comprises a first transmitting antenna;

the second transmitting location comprises a second transmitting antenna;

the first receiving location comprises a first receiving antenna; and the second receiving location comprises a second receiving antenna.

10. The method of claim 1 in which the determining the first timing offset comprises finding an offset for which a peak value within the first correlation output is maximized.

11. The method of claim 1 in which the determining the first timing offset comprises finding a difference between two symbols adjacent to a maximum value signal within the first correlation output.

12. The method of claim 1 in which the determining the first timing offset comprises comparing a sum of energy comprised in symbols prior to a maximum value signal and a sum of energy comprised in symbols following the maximum value signal within the first correlation output.

13. The method of claim 1 in which the determining the first timing offset comprises evaluating a weighted average of indices of the first correlation output, where the weights are an even power of the values at these indices.

14. A multiple-input multiple-output (MIMO) communication system comprising:
   a transmitting MIMO unit configured to transmit:
      a first symbol sequence comprising a preamble symbol sequence Si from a first transmitting location; and
      a second symbol sequence comprising a preamble symbol sequence S2 from a second transmitting location;
      the first and second symbol sequences being modulated onto a same carrier frequency;
   and
   a receiving MIMO unit comprising:
      a first receiving location configured to receive the first and the second symbol sequences;
      a correlator for correlating the first and the second symbol sequences with a symbol sequence P1 to produce a first correlation output;
      a timing offset estimator for determining a first timing offset for receiving the first symbol sequence based, at least in part, on the first correlation output
      a correlator for correlating h first and the second symbol sequences with a sequence P2 ice a second correlation; out
      a timing offset estimator for determining a second symbol timing synchronization for receiving the second symbol sequence based, at least in part, on the second correlation output.

15. The MIMO communication system of claim 14 wherein:
   the transmitting MIMO unit is configured to transmit the preamble symbol sequence S1 and the preamble symbol sequence S2 timed so that the preamble symbol sequence S1 is received by the receiving MIMO unit at a time overlapping a time at which the preamble symbol sequence S2 is received by the MIMO receiver.

16. The MIMO communication system of claim 15 in which the overlapping time is such that correlating S2 to P1 produces a zero section overlapping a maximum of a line approximated by correlation of S1 and P1.

17. The MIMO communication system of claim 14 in which:
   S1 and P1 are symbol sequences such that a cross-correlation between S1 and P1 produces a cross-correlation output comprising a section having symbol values which approximate a line having a detectable specific location within the section; and
   S1 and P2 are symbol sequences such that cross-correlation between S1 and P2 produces a cross-correlation output comprising a zero section with all symbols in the zero section lower in value than a maximum of the line approximated by correlation of S2 and P2 at least by an order of magnitude.

18. The MIMO communication system of claim 17 in which the line has a central peak.

19. The MIMO communication system of claim 14 in which:
   the first transmitting location comprises a first transmitting antenna;
   the second transmitting location comprises a second transmitting antenna;
   the first receiving location comprises a first receiving antenna; and
   the second receiving location comprises a second receiving antenna.

20. A single-carrier multiple input multiple output (MIMO) receiver comprising:
   a first location configured to receive a first mixture of a first symbol sequence and a second symbol sequence;
   a second location configured to receive a second. mixture of the first symbol sequence and the second symbol sequence;
   a correlator for correlating the first mixture with a symbol sequence P1 to produce a first correlation output;
   a correlator for correlating the first symbol sequence and the second symbol sequence with a symbol sequence P2 to produce a second correlation output;
   a timing estimator for determining a first timing offset for receiving the first symbol sequence based, at least in part, on the first correlation output; and
   a timing offset estimator for determining a second timing offset for receiving the second symbol sequence based, at least in part, on the second correlation output.

21. The MIMO receiver of claim 20 in which:
   S1 and P1 are symbol sequences such that a cross-correlation between S1 and P1 produces a cross-correlation output comprising a section having symbol values which approximate a line having a detectable specific location within the section; and
   S1 and P2 are symbol sequences such that cross-correlation between S1 and P2 produces a cross-correlation output comprising a zero section with all symbols in the zero section lower in value than a maximum of the line approximated by correlation of S1 and P1 at least by an order of magnitude.

22. The MIMO receiver of claim 21 in which the line has a central peak.

23. The MIMO receiver of claim 20 in which the determining the first timing offset comprises evaluating a weighted average of indices of the first correlation output, where the weights are an even power of the values at these indices.

* * * * *